US010274813B2

(12) United States Patent
Noguchi

(10) Patent No.: US 10,274,813 B2
(45) Date of Patent: Apr. 30, 2019

(54) DISPLACEMENT DETECTING APPARATUS, LENS BARREL, AND IMAGE PICKUP APPARATUS

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 15/156,758

(22) Filed: May 17, 2016

(65) Prior Publication Data

US 2016/0344909 A1 Nov. 24, 2016

(30) Foreign Application Priority Data

May 19, 2015 (JP) .................................. 2015-101566

(51) Int. Cl.
*G02B 7/04* (2006.01)
*G02B 7/08* (2006.01)
*G03B 3/10* (2006.01)
*G03B 17/14* (2006.01)

(52) U.S. Cl.
CPC ............... *G03B 17/14* (2013.01); *G02B 7/04* (2013.01); *G02B 7/08* (2013.01); *G03B 3/10* (2013.01); *G03B 2205/0053* (2013.01)

(58) Field of Classification Search
CPC .. G03B 17/14; G03B 3/10; G03B 2205/0053; G02B 7/09
See application file for complete search history.

(56) References Cited

U.S. PATENT DOCUMENTS

| 4,841,225 A | 6/1989 | Meyer |
| 4,998,103 A | 3/1991 | Rosswurm et al. |
| 5,068,653 A * | 11/1991 | Klingler ............ G01B 7/02 324/161 |
| 5,304,937 A * | 4/1994 | Meyer ............... G01D 5/2415 324/662 |

(Continued)

FOREIGN PATENT DOCUMENTS

| CN | 101432627 A | 5/2009 |
| CN | 102955045 A | 3/2013 |

(Continued)

OTHER PUBLICATIONS

Office Action issued in Japanese Appln. No. 2015-101566 dated Jan. 29, 2019. English translation provided.

(Continued)

*Primary Examiner* — Jason A Flohre
(74) *Attorney, Agent, or Firm* — Rossi, Kimms & McDowell LLP

(57) ABSTRACT

A displacement detecting apparatus includes a first electrode having a base electrode segment and a plurality of detecting electrode segments, a second electrode having a plurality of periodically arranged electrode segments, and displaceable relative to the first electrode, and a detector configured to detect a displacement of the second electrode relative to the first electrode based on a capacitance between the first electrode and the second electrode. An area of an overlapping region between the base electrode segment and the electrode segments in the second electrode is constant.

17 Claims, 10 Drawing Sheets

(56) References Cited

U.S. PATENT DOCUMENTS

| | | | | |
|---|---|---|---|---|
| 5,317,351 | A | * | 5/1994 | Takahara ............... H01G 5/145 324/660 |
| RE34,741 | E | * | 9/1994 | Andermo ............... G01B 7/003 324/660 |
| 5,896,032 | A | | 4/1999 | Yagi et al. |
| 5,977,781 | A | * | 11/1999 | Jordil ................... G01D 5/2415 324/658 |
| 6,292,001 | B1 | | 9/2001 | Sasaki et al. |
| 2013/0096862 | A1 | * | 4/2013 | Nakamura ............. G01D 5/347 702/94 |
| 2013/0163975 | A1 | * | 6/2013 | Toyama ................ G03B 13/32 396/144 |
| 2015/0323352 | A1 | * | 11/2015 | Nagura ............. G01D 5/24485 250/231.1 |

FOREIGN PATENT DOCUMENTS

| | | |
|---|---|---|
| CN | 103364589 A | 10/2013 |
| JP | 59180462 A | 10/1984 |
| JP | S62262009 A | 11/1987 |
| JP | 63024125 A | 2/1988 |
| JP | 64029772 A | 1/1989 |
| JP | 4297817 A | 10/1992 |
| JP | 5223510 A | 8/1993 |
| JP | 8278105 A | 10/1996 |
| JP | 8327306 A | 12/1996 |
| JP | 9178407 A | 7/1997 |
| JP | 10148503 A | 6/1998 |
| JP | 2000146508 A | 5/2000 |
| JP | 2001249001 A | 9/2001 |
| JP | 2009037774 A | 2/2009 |
| JP | 2010043894 A | 2/2010 |
| JP | 2010101729 A | 5/2010 |
| JP | 2012255899 A | 12/2012 |

OTHER PUBLICATIONS

Office Action issued in Chinese Appln. No. 201610323480.4 dated Feb. 2, 2019. English translation provided.

* cited by examiner

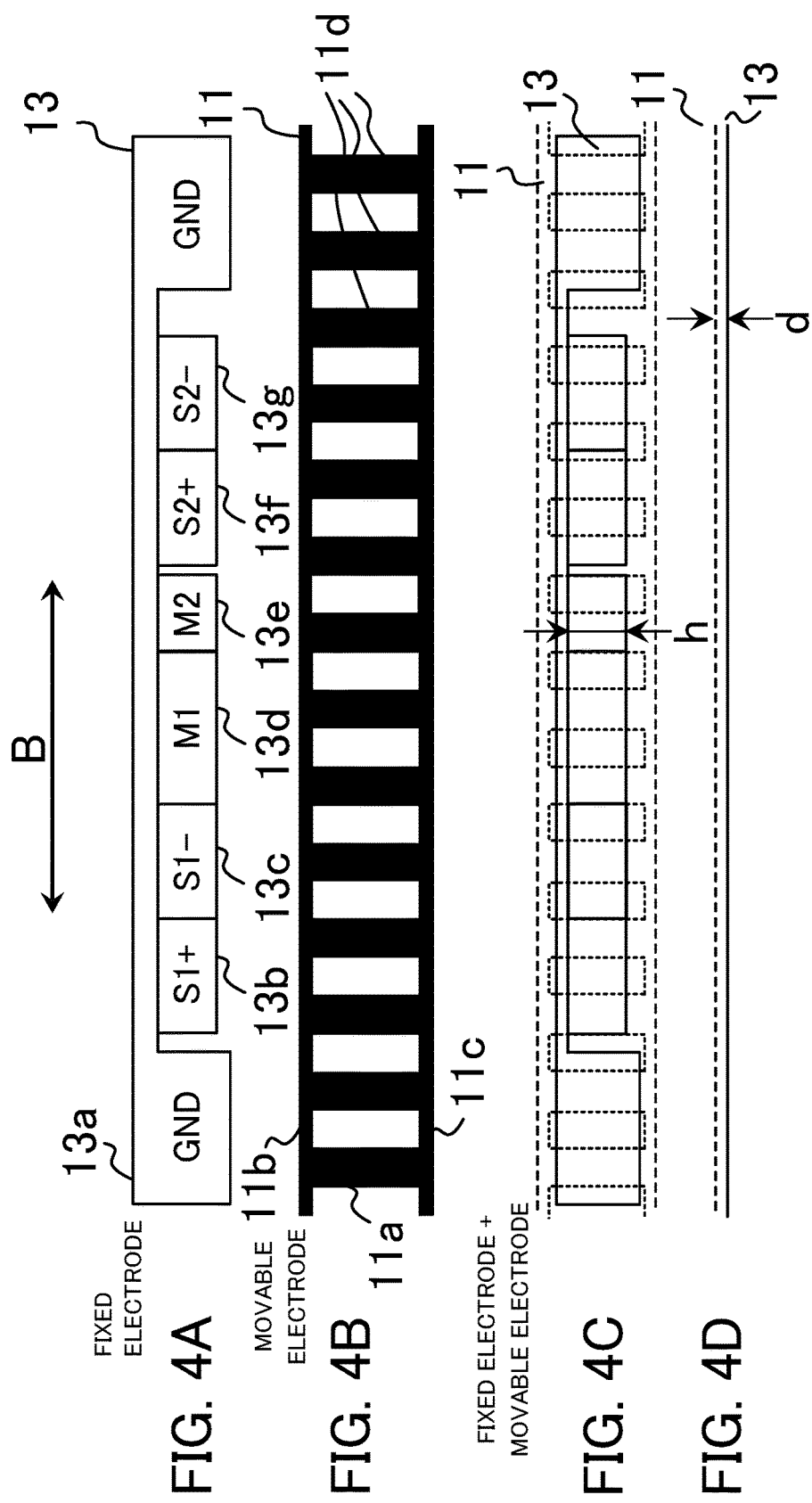

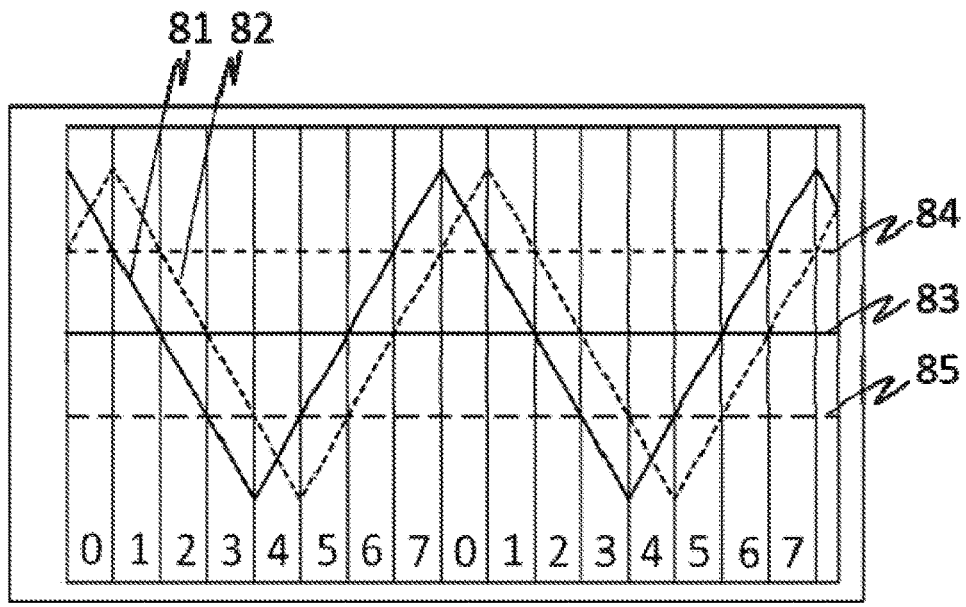
FIG. 8A
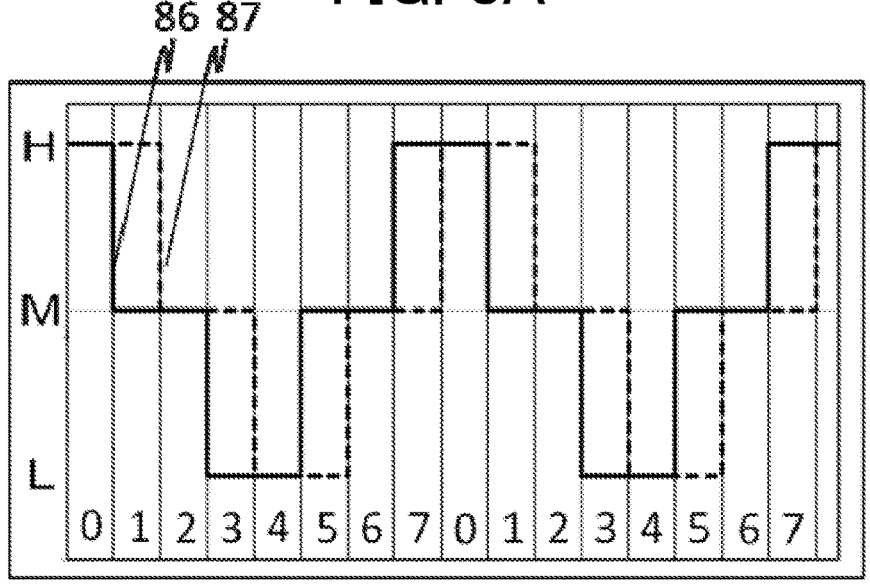
FIG. 8B
| STATUS | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| $S_{1P}$ | H | M | M | L | L | M | H | H | H | M | M | L | L | M | M | H |
| $S_{2P}$ | H | H | M | M | L | L | M | M | H | H | M | M | L | L | M | M |
FIG. 8C $V = V_S + V_G$ ............ (1)
$Q_G = Q_{S1} + Q_{S2} + Q_{S3} + Q_{S4} + Q_{S5} + Q_{S6}$ ---- (2)
$Q_{S1 \sim S6} = C_{S1 \sim S6} \times V_S$ ............ (3)

DISPLACEMENT DETECTING APPARATUS, LENS BARREL, AND IMAGE PICKUP APPARATUS

BACKGROUND OF THE INVENTION

Field of the Invention

The present invention relates to a lens barrel for an optical apparatus, such as a video camera and a digital still camera.

Description of the Related Art

A conventional lens barrel having a so-called manual focus ("MF") function detects a rotation of an operating ring using electric means, and electrically drives a focusing lens in accordance with the rotation.

Japanese Patent Laid-Open No. 2012-255899 discloses a lens barrel configured to detect a rotation amount and a rotation direction of a rotational operation unit based on a detection signal obtained from a pair of photo-interrupters that detect light passing through a plurality of slits (notches) provided at regular intervals in the circumference direction of the rotational operation unit. The lens barrel disclosed in JP 2012-255899 rotates a screw through a stepping motor in accordance with the rotation information of the rotational operation unit containing, for example, the rotated direction and the rotation amount, and realizes a manual focusing mode (MF function) by following the movement of a nut engaged with the screw.

The lens barrel disclosed in JP 2012-255899 detects the rotation of the rotational operation unit using a noncontact type structure with the pair of photo-interrupters for the MF function. The photo-interrupter consumes a comparatively large amount of current. In addition, the rotation of the rotational operation unit cannot be detected when none of the outputs of the pair of photo-interrupters change, and it is thus difficult to improve the rotation detecting resolution.

SUMMARY OF THE INVENTION

The present invention provides a displacement detecting apparatus, a lens barrel, and an image pickup apparatus having a low power consumption and a high resolution.

A displacement detecting apparatus according to one aspect of the present invention includes a first electrode having a base electrode segment and a plurality of detecting electrode segments, a second electrode having a plurality of periodically arranged electrode segments, and displaceable relative to the first electrode, and a detector configured to detect a displacement of the second electrode relative to the first electrode based on a capacitance between the base electrode segment and the electrode segment in the second electrode and each detecting electrode segment and the electrode segment in the second electrode. An area of an overlapping region between the base electrode segment and the electrode segments in the second electrode is constant.

Further features of the present invention will become apparent from the following description of exemplary embodiments with reference to the attached drawings.

BRIEF DESCRIPTION OF THE DRAWINGS

FIGS. 4A to 4D are detailed views of the movable and fixed electrodes according to the first embodiment.

FIGS. 8A to 8C are graphs illustrating displacement signals based on a capacitance formed between the fixed electrode and movable electrode according to the first embodiment.

DESCRIPTION OF THE EMBODIMENTS

Referring now to the accompanying drawings, a detailed description will be given of the embodiments of the present invention.

First Embodiment

Figure 1:
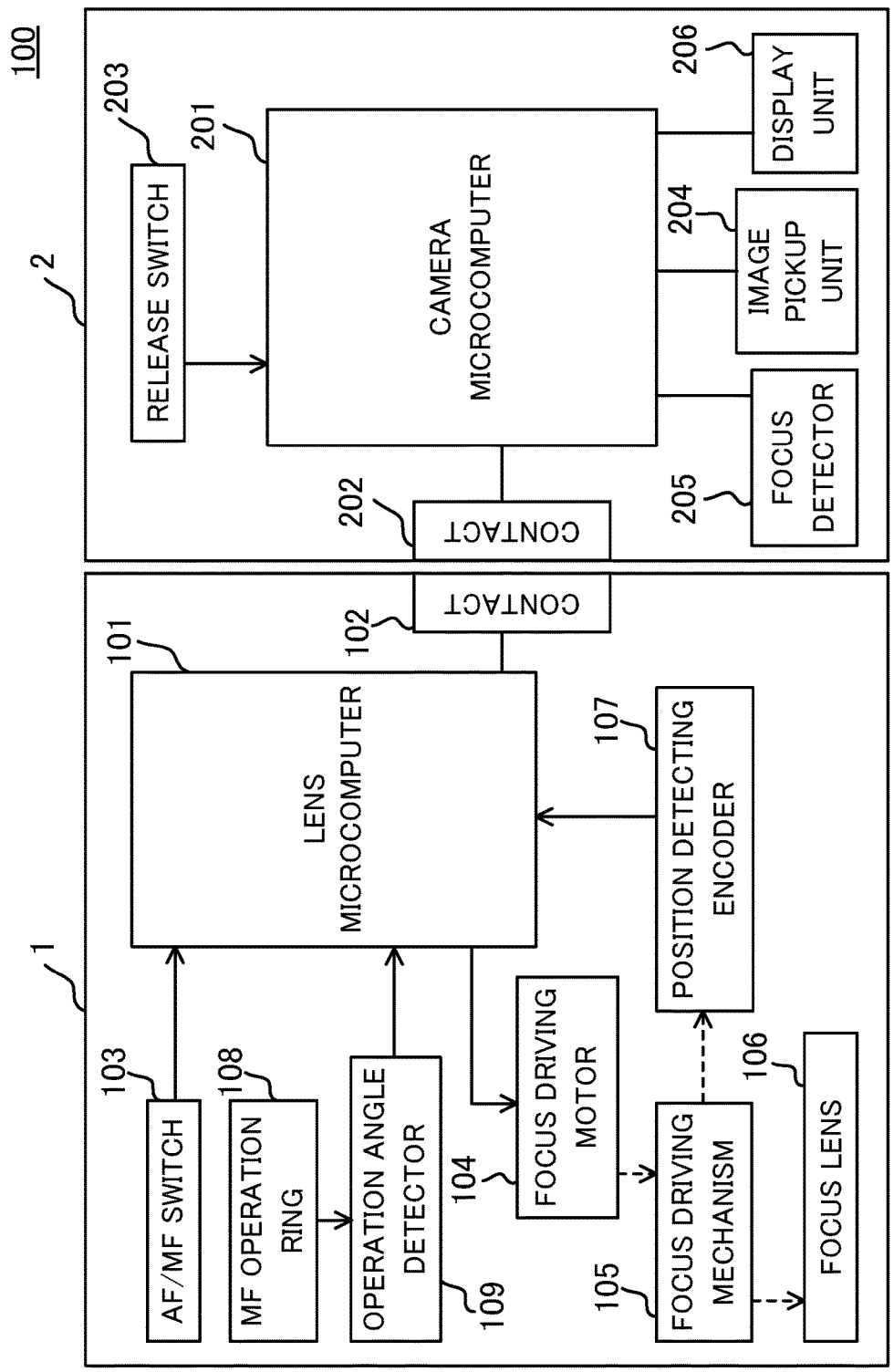
FIG. 1 is a block diagram of an image pickup apparatus according to each embodiment.

Referring now to FIG. 1, a description will be given of a structure of an image pickup apparatus (image pickup apparatus body or single-lens reflex camera) and a lens barrel (interchangeable lens) that can be attached to and detached from the image pickup apparatus body according to a first embodiment. FIG. 1 illustrates a block diagram of an image pickup apparatus 100 according to this embodiment. In FIG. 1, a solid line between blocks represents an electric connection, and a broken line represents a mechanical connection.

The image pickup apparatus 100 includes a camera 2 (image pickup apparatus body), and an interchangeable lens 1 (lens barrel) that can be attached to and detached from the camera 2. Reference numeral 201 denotes a camera microcomputer (controller), and reference numeral 202 denotes a contact. The camera microcomputer 201 controls each component in the camera 2, as described later, and communicates with the interchangeable lens 1 via the contact 202 when the interchangeable lens 1 is attached.

Reference numeral 203 denotes a two-stage stroke type release switch. A signal output from the release switch 203 is input into the camera microcomputer 201. The camera microcomputer 201 is ready for image pickup based on the signal input from the release switch 203 by determining an exposure amount for an unillustrated photometric unit and by performing the following AF operation when the first stage stroke switch (SW1) is turned on. The camera microcomputer 201 sends an image pickup starting command to an image pickup unit 204 for actual exposure when the second stage stroke switch (SW2) is turned on in the release switch 203. The image pickup unit 204 has an image sensor, such as a CMOS sensor and a CCD sensor, and outputs an image signal by photoelectrically converting an optical image formed by the interchangeable lens 1 (optical system).

Reference numeral 205 denotes a focus detector. The focus detector 205 detects a focus state of an object in a focus detecting area in accordance with a focus detection start command sent from the camera microcomputer 201 when the camera 2 is set to the following AF mode and the SW1 in the release switch 203 is turned on. The focus detector 205 generates moving information containing a moving direction and a moving amount in an optical axis direction of a focus lens 106 necessary for focusing on the object based on the focus detection result. Reference numeral 206 denotes a display unit configured to display a captured image obtained by the image pickup unit 204.

Reference numeral 101 denotes a lens microcomputer (controller) in the interchangeable lens 1. The lens microcomputer 101 controls each component in the interchangeable lens as described later, and communicates with the camera 2 via a contact 102. Reference numeral 103 denotes an AF/MF switch configured to switch autofocus and manual focus, and used for a user to select a focus mode between the AF (autofocus) mode and the MF (manual focus) mode.

In the AF mode, the camera microcomputer 201 sends to the lens microcomputer 101 the focus detection result obtained from the focus detector 205 in accordance with SW1 ON of the release switch 203. The lens microcomputer 101 drives a focus driving motor 104 that generates a driving force based on the focus detection result using electric energy. The driving force made by the focus driving motor 104 is transmitted to a focus driving mechanism 105. The focus driving mechanism 105 drives the focus lens 106 in the optical axis direction by a necessary moving amount in accordance with the driving force of the focus driving motor 104. The focus driving motor 104 may use a stepping motor, an ultrasonic motor, etc. The focus driving mechanism 105 may use a so-called bar/sleeve support direct-acting mechanism, and a so-called rotary cam mechanism in which a cam ring having three cam grooves and a fixed unit having three linear grooves cooperate, etc.

Reference numeral 107 denotes a position detecting encoder (position detector). The position detecting encoder 107 is, for example, an absolute value encoder configured to output information corresponding to a position of the focus lens 106 in the optical axis direction. The position detecting encoder 107 may use a photo-interrupter configured to detect a base position, and to detect an absolute position using an integrated value of an incremental signal that changes at micro intervals (such as a driving pulse number of a stepping motor and a repetitive signal of an MR sensor).

In the AF mode, the lens microcomputer 101 controls driving of the focus driving motor 104 in accordance with a necessary moving amount of the focus lens 106 determined based on the focus detecting result of the focus detector 205. When the necessary moving amount of the focus lens 106 is equal to the actual moving amount as a detection result of the position detecting encoder 107, the lens microcomputer 101 stops the focus driving motor 104 and informs the camera microcomputer 201 of the focusing control completion.

In the MF mode, the user operates an MF operation ring 108 (movable member) for controlling focusing. Reference numeral 109 denotes an operation angle detector (displacement detecting apparatus) configured to detect a rotated angle (displacement) of the MF operation ring 108. When the user rotates the MF operation ring 108 while confirming the focus state of the object through the display 206, the lens microcomputer 101 reads an output signal of the optical angle detector 109, drives the focus driving motor 104, and moves the focus lens 106 in the optical axis direction. The user can control precise focusing and improve the operability in the MF mode by precisely detecting the rotation of the MF operating ring 108 using the operation angle detector 109. Details of detections by the operation angle detector 109 will be described later.

Figure 2A:
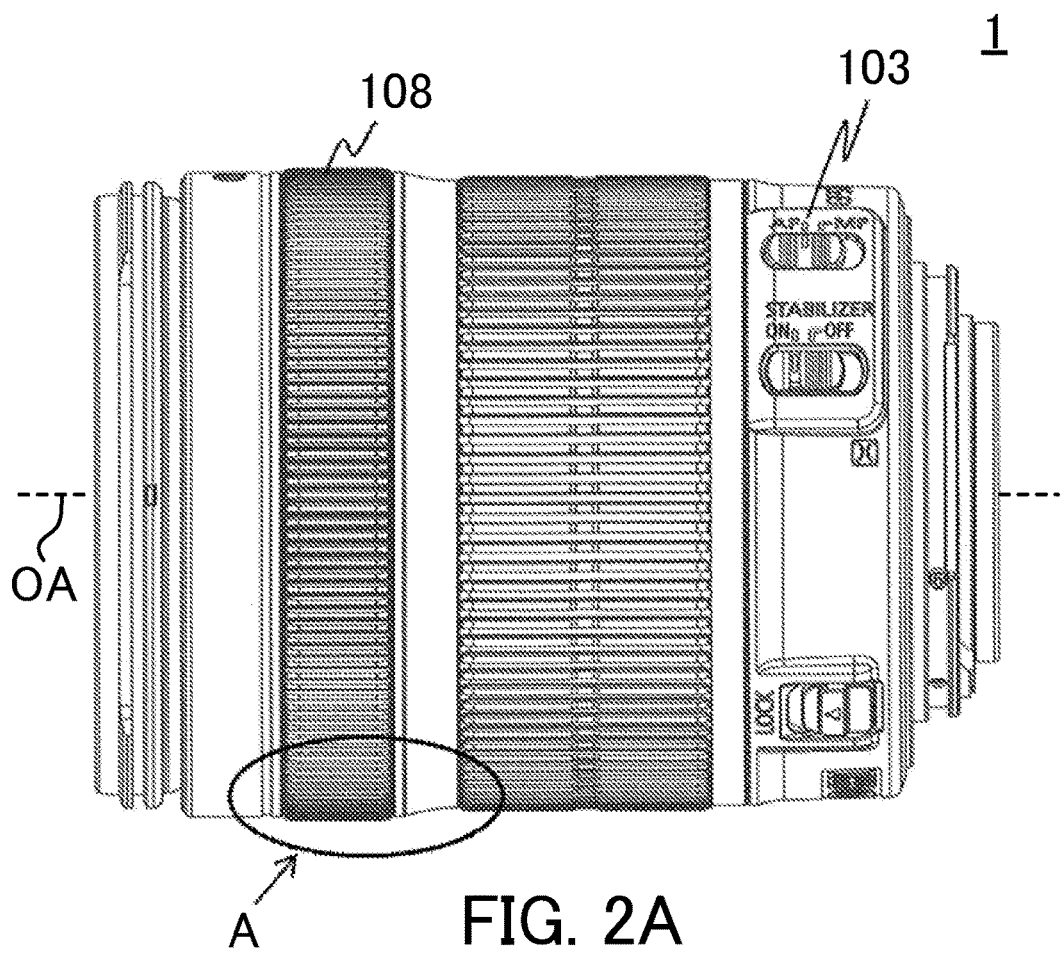
FIGS. 2A and 2B are structural views of an interchangeable lens according to the first embodiment.
Figure 2B:
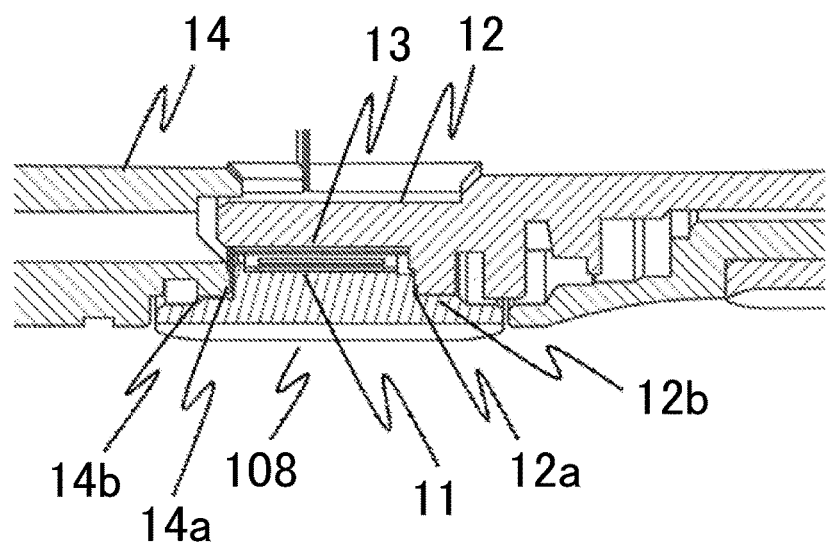

Referring now to FIGS. 2A and 2B, a description will be given of a structure of the interchangeable lens 1. FIGS. 2A and 2B are structural views of the interchangeable lens 1. FIG. 2A is an overview of the interchangeable lens 1. As illustrated in FIG. 2A, the AF/MF switch 103 is arranged on the side surface at the back end of the interchangeable lens 1 (on the right side in FIG. 2A). The rotatably supported MF operation ring 108 is disposed at the top of the interchangeable lens 1 (on the left side in FIG. 2A).

FIG. 2B is an enlarged view of an eclipse A in FIG. 2A, and a sectional view of a principal part of the MF operation ring 108. Reference numeral 11 denotes a movable electrode (second electrode). The movable electrode 11 is a conductive electrode integrated with an inner circumference wall coaxial with the rotation center axis of the MF operation ring 108. Reference numeral 12 denotes a guide cylinder (fixing member). Reference numeral 13 is a fixed electrode (first electrode) integrated with the guide cylinder 12 opposite to the movable electrode 11. Reference numeral 14 denotes a front frame integrated with the guide cylinder at an unillustrated part. The MF operation ring 108 is disposed between the surfaces 12a and 14a in the front and back direction of the optical axis OA with predetermined apertures, and is rotatable at a constant position by engagement supports of the cylinder surfaces 12b and 14b. In this embodiment, the movable electrode 11 disposes a metal ring as a separate component of a conductive electrode on the inner circumference wall of the MF operation ring 108, and this metal ring is integrated with the MF operation ring 108. The fixed electrode 13 includes a copper foil pattern of a flexible wiring substrate as an electrode and is fixed with on an outer circumferential wall of the guide cylinder 12 by an adhesive tape or adhesive agent. The present invention is not limited to this embodiment, and an electrode pattern, which will be described later, may be directly formed on the inner circumferential wall of the MF operation ring 108 or the outer circumferential wall of the guide cylinder 12 using a technology of plating, evaporation, and screen printing of a conductive material.

Figure 3A:
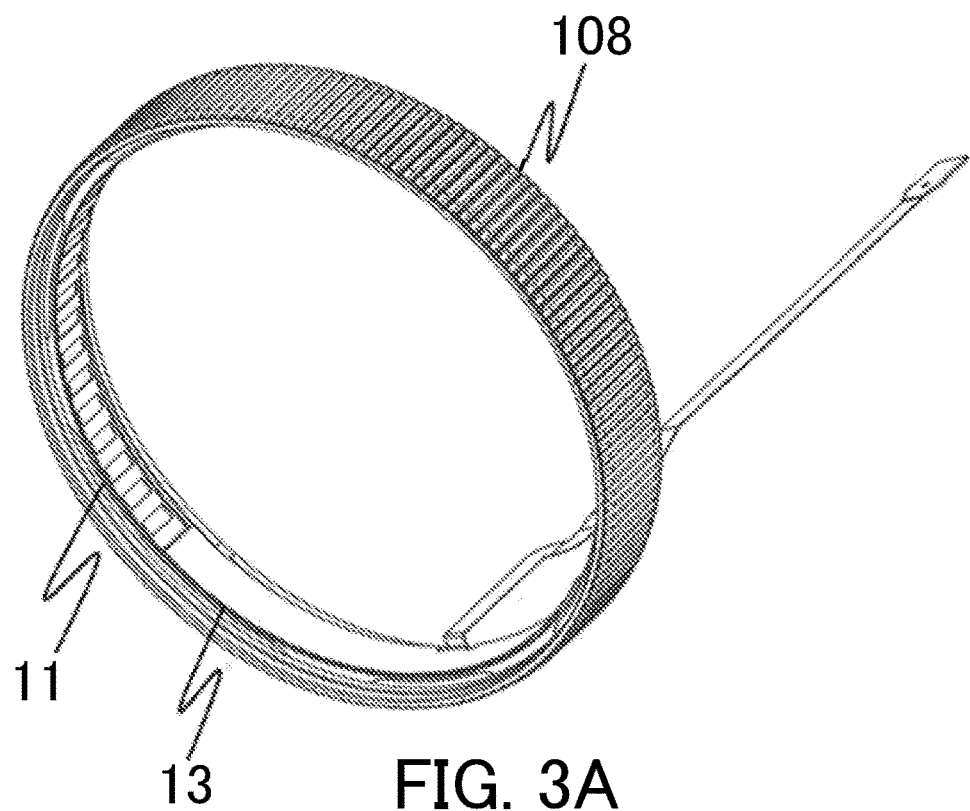
FIGS. 3A and 3B are exploded perspective views of a movable electrode and a fixed electrode according to the first embodiment.
Figure 3B:
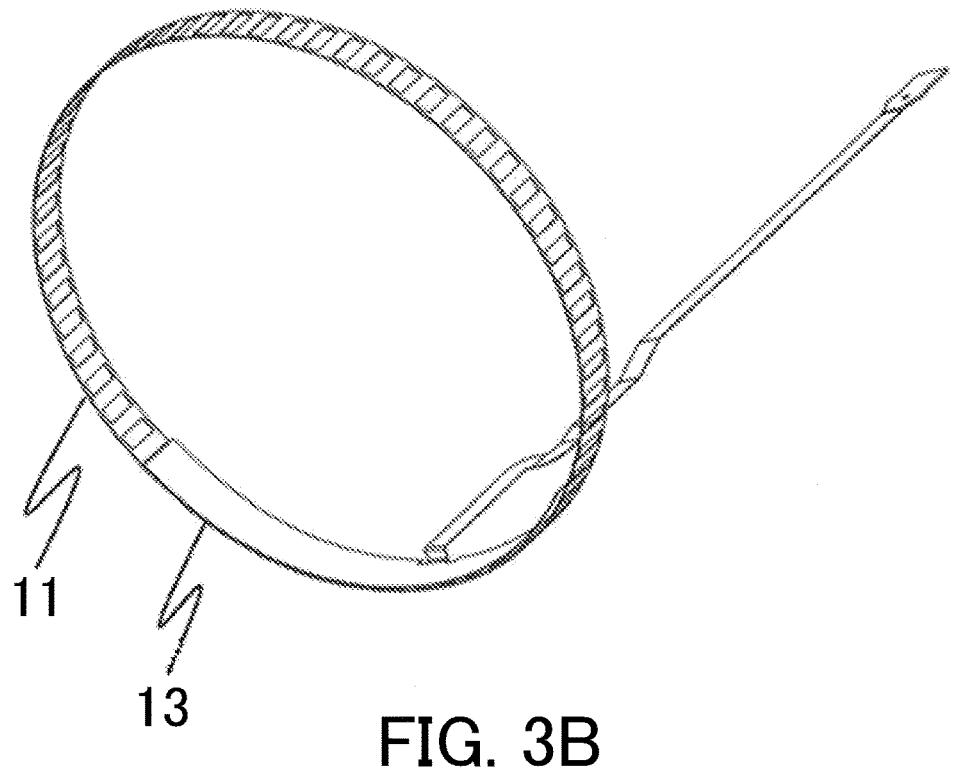

Referring now to FIGS. 3A and 3B, a description will be given of structures of the movable electrode 11 and the fixed electrode 13. FIGS. 3A and 3B are exploded perspective views of the movable electrode 11 and the fixed electrode 13. FIG. 3A is a view illustrating a relationship among the MF operation ring 108, the movable electrode 11, and the fixed electrode 13. FIG. 3B is FIG. 3A in which the MF operation ring 108 is omitted. As illustrated in FIGS. 3A and 3B, the movable electrode 11 has a periodic pattern of rectangular conductive electrode segments or strips arranged on an entire cylinder in the circumferential direction around the optical axis. The fixed electrode 13 is a flexible wiring substrate opposite to the movable electrode 11, and extends in a finite angular range in a cylinder coaxial with the movable electrode 11.

Referring now to FIGS. 4A to 4D, a description will be given of a detection principle of the operation angle detector 109 configured to detect a rotated angle of the MF operation ring 108. For easy description and better understanding, a developed plane view along the rotated direction as a detecting direction will be used. FIGS. 4A to 4D are detailed views of the movable electrode 11 and the fixed electrode 13. FIG. 4A is a plane view of the fixed electrode 13. FIG. 4B is a plane view of the movable electrode 11. FIG. 4C is a plane view in which the fixed electrode 13 and movable electrode 11 overlap each other. A direction of an arrow B in FIG. 4A is a detecting detection (rotation direction).

Referring now to FIG. 4A, a description will be given of the electrode pattern of the fixed electrode 13. The length in the detecting direction of each electrode will be described later with reference to FIG. 5. As illustrated in FIG. 4A, the fixed electrode 13 includes base electrode segment 13a (GND electrode segments), and detecting electrode segments 13b, 13c, 13d, 13e, 13f, and 13g. The detecting electrode segments 13b, 13c, 13d, 13e, 13f, and 13g are an S1+ electrode segment, an S1− electrode segment, an M1 electrode segment, an M2 electrode segment, an S2+ electrode segment, and an S2− electrode segment, respectively. FIG. 4A illustrates as if the neighboring detecting electrode segments contact each other, but these electrode segments are actually spaced by a slight interval for insulations.

FIG. 4B is a developed view of the movable electrode 11 having a cylindrical shape illustrated in FIGS. 3A and 3B. A black area in the movable electrode 11 is a conductive electrode part. Reference numeral 11a denote electrode segments arranged in a periodic pattern (periodically arranged electrode segments) and configured to change a detection output. Reference numerals 11b and 11c are conductive electrode strips for connecting the electrode segments 11a to each other. FIG. 4C illustrates the fixed electrode 13 and the movable electrode 11 overlapping each other. In FIG. 4C, the movable electrode 11 is illustrated by a broken line. In FIG. 4C, the length h represents an overlapping region (length) in a direction orthogonal to the detecting direction B of the electrode segments 11a (electrode segment group 11a having a plurality of electrode segments 11d) and the detecting electrode segments 13b, 13c, 13d, 13e, 13f, and 13g, which is a capacitance generating area as a capacitor. FIG. 4D illustrates the fixed electrode 13 and the detecting electrode 11 viewed from a thickness direction, which is orthogonal to both the detecting direction B and the direction of the length h. In FIG. 4D, the length d is a gap (interval) in the capacitor. The capacitance C is proportional to the overlapping area of the opposing electrodes and the dielectric constant of the gap, and is inversely proportional to the gap d. In other words, $C=\varepsilon \cdot S/d$ is established where C is the capacitance, $\varepsilon$ is the dielectric constant, S is the overlapping area, and d is the gap.

Figure 5:
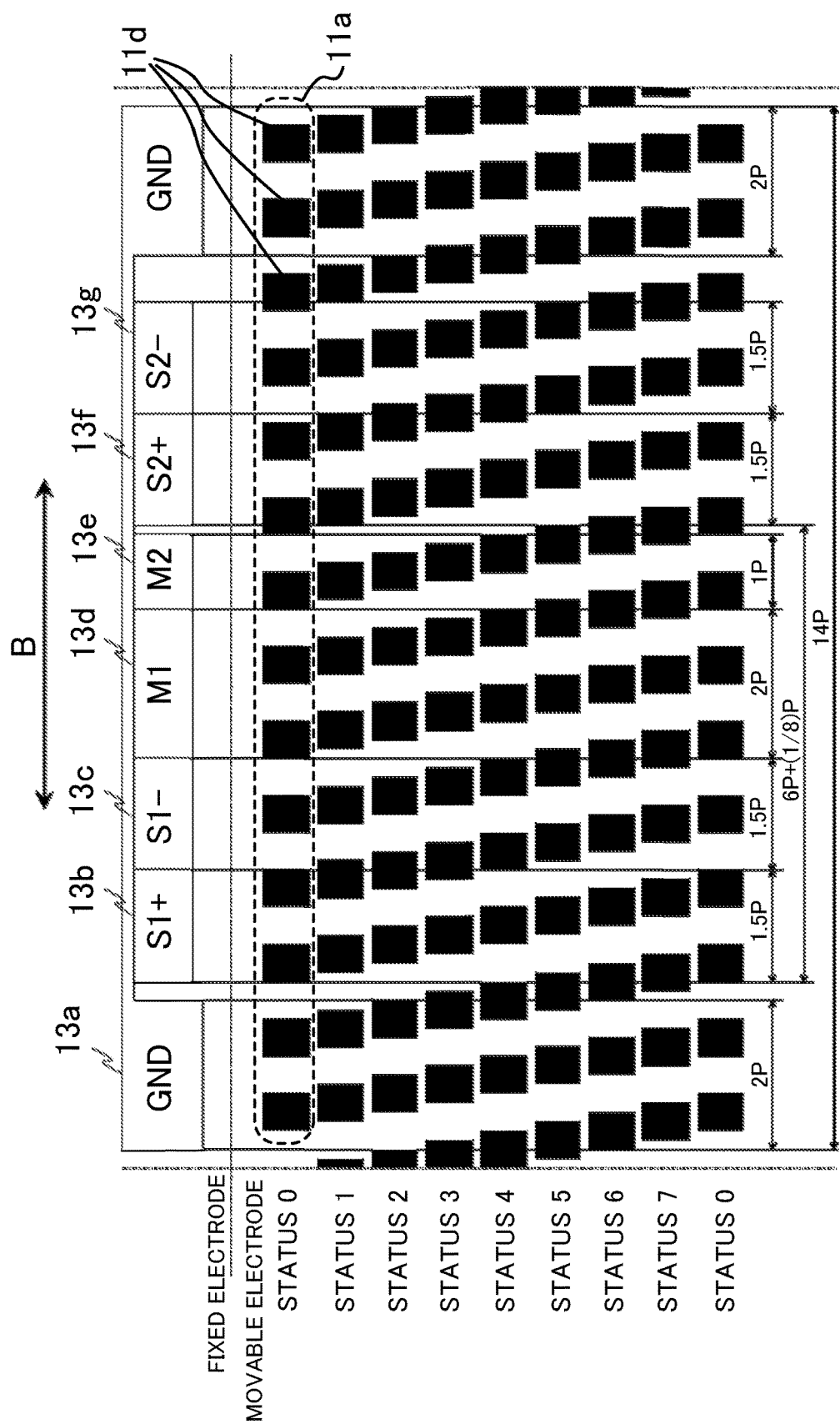
FIG. 5 is a views illustrating a relationship between the movable and fixed electrodes according to the first embodiment.

Referring now to FIG. 5, a description will be given of a relationship between the fixed electrode 13 and the movable electrode 11. FIG. 5 is a view illustrating a relationship between the fixed electrode 13 and the movable electrode 11. The electrode pattern of the fixed electrode 13 is illustrated at the top in FIG. 5, similarly to FIG. 4A. In the lower side in FIG. 5, the electrode segments 11a of the movable electrode 11 are illustrated in black. The electrode segments 11a form a capacitor with an overlapping region having a length h with the detecting electrode segments 13b to 13g as illustrated in FIG. 4C. FIG. 5 illustrates eight characteristic states in the movement (displacement or rotation) of the movable electrode 11 from left to right in the detecting direction B in order of the statuses 0 to 7 and the status 0. The movable electrode 11 and the fixed electrode 13 overlap each other and form the capacitor, as illustrated in FIG. 4C. FIG. 5 illustrates their arrangement for better understanding.

Where P denotes a pitch (period) of the electrode segments 11a, and this embodiment set a ratio of the electrode segment in one pitch to 50%. The following description sets an area of one electrode segment 11d in the electrode segments 11a illustrated in black conveniently to 1. A moving amount of the movable electrode 11 between two statuses is (1/8)P, and the statuses 0 and 4 shift from each other by a phase difference of 180° with respect to the pitch P.

The base electrode segment 13a (GND or grounded electrode segments) of the fixed electrode 13 overlaps the electrode segments 11a in the movable electrode 11 at both sides having a length of 4P that is a sum of a left end length of 2P and a right end length of 2P. The base electrode segment 13a (GND electrode segments) partially overlaps the electrode segments 11a in the center portion having a length 10P between the left and right ends with lengths of 2P in the length of 14P. The base electrode segment 13a has a length of L×P in the detecting direction B where L is a natural number, L is 4 (for a sum of the lengths of the left and right ends or 2P×2=4P) or 14 (for its overall length of 14P) in this embodiment. An effect of the overlapping region having a length of 10P with part of the base electrode segment 13a will be described later.

The length of the base electrode segment 13a (GND electrode segment) is an integral multiple of the pitch P. An area of the overlapping region is always constant between the base electrode segment 13a (GND electrode segment) and electrode part (electrode segments 11a) of the movable electrodes 11. When the gap d is constant, the capacitance C is also constant. Each of the detecting electrode segment 13b (S1+ electrode segment) and the detecting electrode segment 13c (S1− electrode segment) has a length of 1.5P, and they have a phase difference of 180°. In the length expressed by (M+0.5)×P where M is 0 or a natural number, M=1 corresponds to this case. An area of the overlapping region between the detecting electrode segment 13b (S1+ electrode) and the electrode segments 11a is 2 in the status 0, 1 in the status 4, and returns to 2 of the status 0 via the status 7. This change is repeated.

The detecting electrode segment 13c (S1− electrode) has a phase difference of 180° from the detecting electrode segment 13b (S1+ electrode). Hence, an area of overlapping region between the detecting electrode segment 13c (S1− electrode) and the electrode segments 11a is 1 in the status 0, and 2 in the status 4. The capacitance C reversely changes between the detecting electrode segment 13b (S1+ electrode) and the detecting electrode segment 13c (S1− electrode). In this embodiment, the detecting electrode segment 13b (S1+ electrode) and the detecting electrode segment 13c (S1− electrode) constitute a pair of displacement detecting electrode segments. An area changing amount of the overlapping region between the detecting electrode segment 13b (S1+ electrode) and the electrode segments 11a is proportional to a movement of the movable electrode 11, and a change of the capacitance C is linear. This is applied to the detecting electrode segment 13c (S1− electrode).

Each of the detecting electrode segment 13f (S2+ electrode) and the detecting electrode segment 13g (S2− electrode) has a length expressed by (M+0.5)×P where M is 0 or a natural number, and they have a phase difference of 180°, forming a pair of displacement detecting electrode segments. In the detecting electrode segment 13f (S2+ electrode) and the detecting electrode segment 13g (S2− electrode), M is 1 similar to the detecting electrode segment 13b (S1+ electrode) and the detecting electrode segment 13c (S1− electrode).

These two pairs of displacement detecting electrodes have a phase difference of 6P+(1/8)P in the detecting direction B and when it is converted into the pitch P as illustrated in FIG. 5, and the capacitance C changes by (1/8)P. An area of the overlapping region between the detecting electrode segment 13f (S2+ electrode) and the electrode segments 11a is 2 in the status 1, and 1 in the status 5. The detecting electrode segment 13g (S2− electrode) has a phase difference of 180° from the detecting electrode segment 13f (S2+ electrode). Hence, an area of the overlapping region between the detecting electrode segment 13f (S2+ electrode) and the electrode segments 11a and an area of the the overlapping region between the detecting electrode segment 13g (S2− electrode) and the electrode segments 11a in the same status have a reverse relationship.

The detecting electrode segment 13d (M1 electrode) has a length of 2P. An area of the overlapping region between the detecting electrode segment 13d (M1 electrode) and the electrode segments 11a is always 2 from the status 0 to the status 7, and thus does not change. The detecting electrode segment 13e (M2 electrode) has a length of 1P. An area of the overlapping region between the detecting electrode segment 13d (M2 electrode) and the electrode segments 11a is always 1 from the status 0 to the status 7, and thus does not change. The detecting electrode segment 13e (M2 electrode) and the detecting electrode segment 13d (M1 electrode) constitute a pair of reference electrodes having lengths expressed by N×P and (N+Q)×P where N and Q are natural numbers, and both N and Q are 1 in this embodiment.

Figure 6:
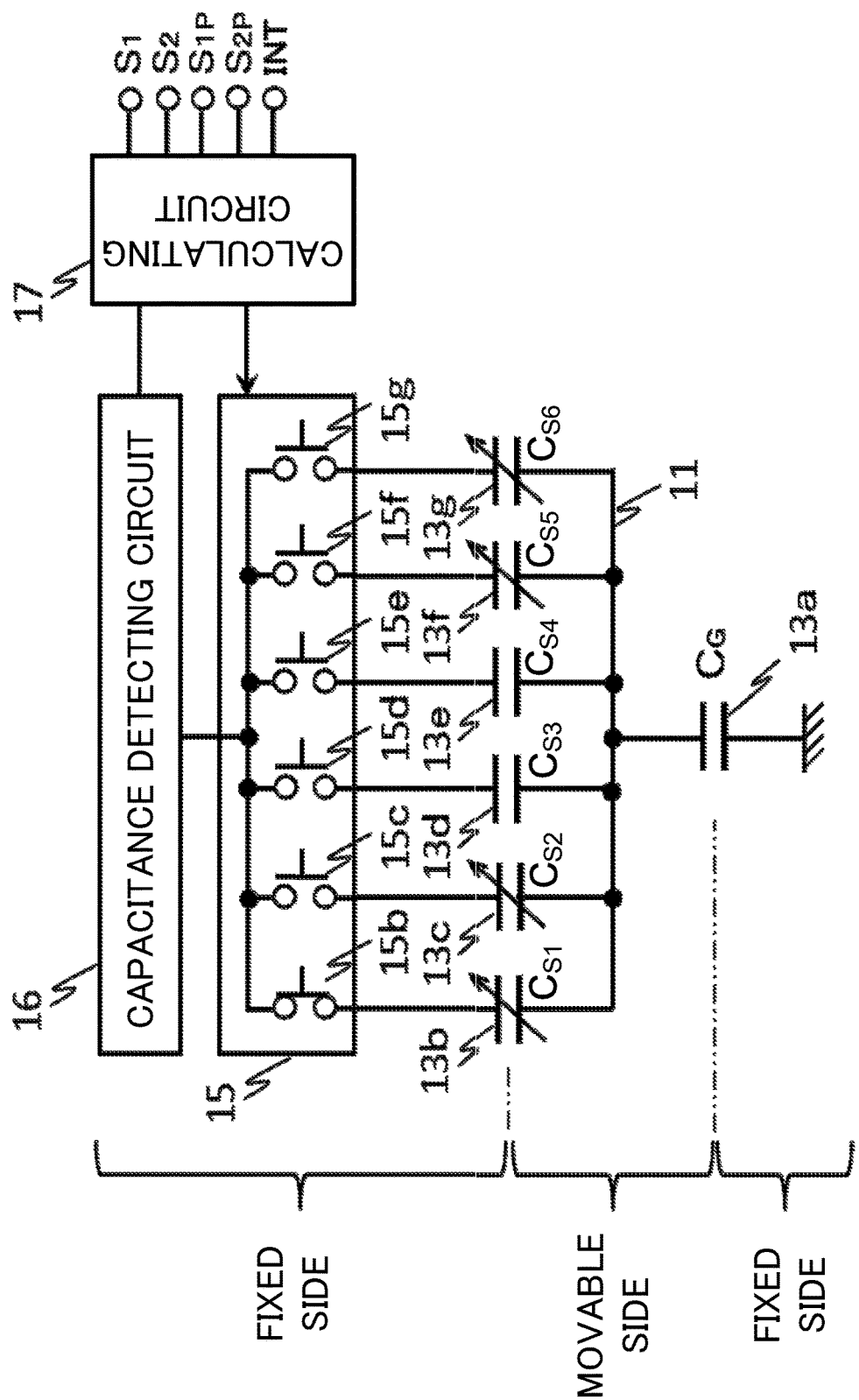
FIG. 6 is an equivalent circuit diagram and signal block diagram of the movable and fixed electrodes according to the first embodiment.

Referring now to FIG. 6, a description will be given of the equivalent circuit of the capacitance formed by the fixed electrode 13 and the movable electrode 11 and signal processor in this embodiment. FIG. 6 is an equivalent circuit diagram and a signal processing block diagram of the fixed electrode 13 and the movable electrode 11.

The fixed electrode 13 has the base electrode segment 13a (GND electrode segment), the detecting electrode segment 13b (S1+ electrode segment), the detecting electrode segment 13c (S1− electrode segment), the detecting electrode segment 13d (M1 electrode segment), the detecting electrode segment 13e (M2 electrode segment), the detecting electrode segment 13f (S2+ electrode segment), and the detecting electrode segment 13g (S2− electrode segment). As illustrated in FIG. 6, each electrode segment in the fixed electrode forms the capacitor with the movable electrode 11. Assume that $C_G$, $C_{S1}$, $C_{S2}$, $C_{S3}$, $C_{S4}$, $C_{S5}$, and $C_{S6}$ represent capacitances of the capacitors formed by the base electrode segment 13a and the detecting electrode electrodes 13b to 13g. When the gap d is constant, the capacitances $C_{S1}$, $C_{S2}$, $C_{S5}$, and $C_{S6}$ are variable capacitors that vary as the movable electrode 11 moves. The capacitances $C_G$, $C_{S3}$, and $C_{S4}$ are of capacitors having a fixed value that does not vary as the movable electrode 11 moves.

Reference numeral 15 denotes an analog switch array, reference numeral 16 denotes a capacitance detecting circuit, and reference numeral 17 denotes a calculating circuit (detector or signal processor). The analog switch array 15 has analog switches 15b, 15c, 15d, 15e, 15f, and 15g. This embodiment connects the analog switches 15b to 15g to the detecting electrode segments 13b to 13g in series, respectively. The calculating circuit 17 sets the analog switches 15b to 15g one by one by time divisions. The capacitance detecting circuit 16 detects a (combined) capacitance that is made by combining the capacitance $C_G$ and the capacitances $C_{S1}$, $C_{S2}$, $C_{S3}$, $C_{S4}$, $C_{S5}$, and $C_{S6}$ connected in series to the capacitance $C_G$. The calculating circuit 17 outputs the signals $S_1$, $S_2$, $S_{1P}$, $S_{2P}$, and INT based on the detection result by the capacitance detecting circuit 16. A detailed description of these signals will be given later.

Figure 7A:
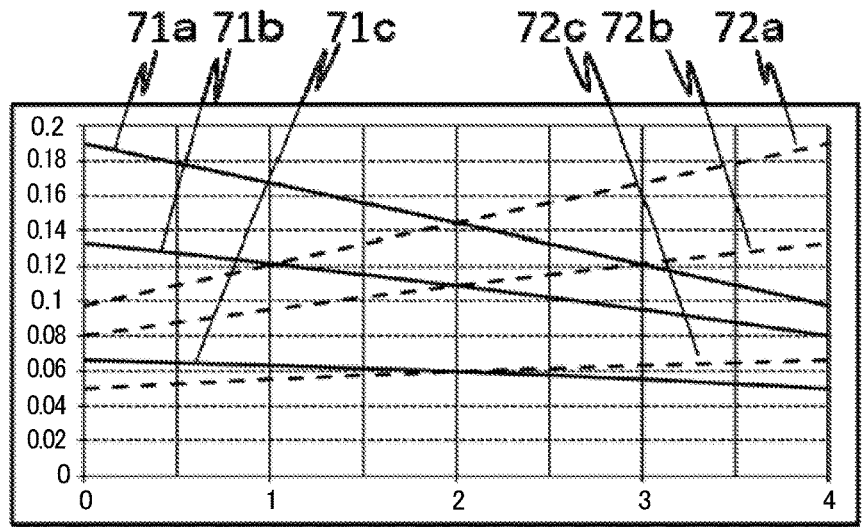
FIGS. 7A to 7C are graphs illustrating signals based on a capacitance formed between the fixed electrode and movable electrode according to the first embodiment.
Figure 7B:
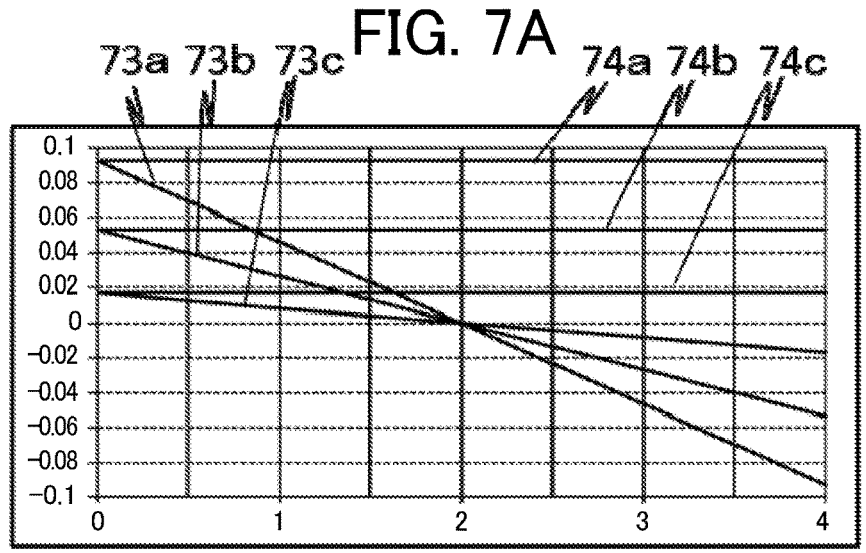
Figure 7C:
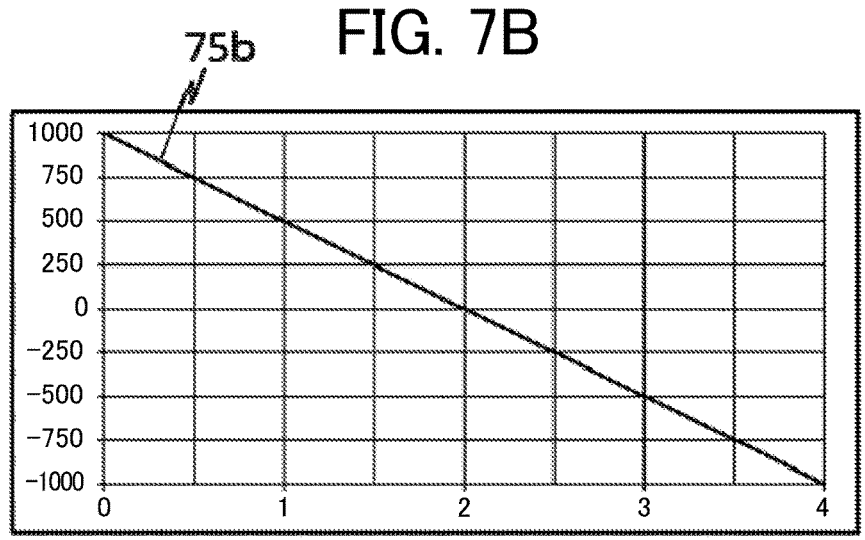

Referring now to FIGS. 7A to 7C, a description will be given of the output signal (output signals of the pair of displacement detecting electrode segments and the pair of reference electrode segments) based on the capacitance of the capacitor formed by the fixed electrode 13 and the movable electrode 11. FIGS. 7A to 7C are graphs illustrating the output signals based on the capacitances formed by the fixed electrode 13 and the movable electrode 11. In particular, FIGS. 7A to 7C illustrate capacitances of the capacitors corresponding to the detecting electrode segment 13b (S1+ electrode), the detecting electrode segment 13c (S1− electrode), the detecting electrode segment 13d (M1 electrode), and the detecting electrode segment 13e (M2 electrode). In FIGS. 7A to 7C, an abscissa axis represents the statuses 0 to 4 described with reference to FIG. 5, and an ordinate axis represents a (combined) capacitance (FIG. 7A), a differential signal (FIG. 7B), and a normalized signal (FIG. 7C), respectively. The capacitance of each capacitor is 0.1 pF with the gap d and the area of 1 conveniently illustrated in FIG. 5. In FIGS. 7A and 7B, the capacitance $C_G$ is set to three types of 0.1 pF, 0.4 pF (corresponding to the length of 4P in FIG. 5), and 4.0 pF, respectively.

FIG. 7A is a graph illustrating a combined capacitance $C_{G\_S1}$ between the capacitance $C_G$ and $C_{S1}$ and a combined capacitance $C_{G\_S2}$ between the capacitance $C_G$ and $C_{S2}$. A reciprocal of each of the combined capacitances $C_{G\_S1}$ and $C_{G\_S2}$ of the two capacitors connected in series are equal to a sum of the reciprocals of the two capacitors. $1/C_{G\_S1}=1/C_G+1/C_{S1}$ and $1/C_{G\_S2}=1/C_G+1/C_{S2}$. For example, when $C_G=0.4$ pF and $C_{S1}=0.2$ pF (in the status 0 in FIG. 5), $C_{G\_S1}=0.133$ pF. When $C_G=0.4$ pF and $C_{S1}=0.1$ pF (in the status 4 in FIG. 5), $C_{G\_S1}=0.080$ pF. This corresponds to the combined capacitance illustrated by a solid line 71b in FIG. 7A.

In FIG. 7A, the solid lines 71a, 71b, and 71c represent a combined capacitance of the detecting electrode segment 13b (S1+ electrode segment) and the base electrode segment 13a (GND electrode segment). The solid line 71a represents $C_G=4.0$ pF, the solid line 71b represents $C_G=0.4$ pF, and the solid line 71c represents $C_G=0.1$ pF. In FIG. 7A, the broken lines 72a, 72b, and 72c represent the combined capacitances between the detecting electrode segment 13c (S1− electrode segment) and the base electrode segment 13a (GND electrode segment). Since the detecting electrode segment 13c (S1− electrode segment) has a phase difference of 180° from the detecting electrode segment 13b (S1+ electrode segment), the broken lines 72a, 72b, and 72c are of left and right inversions to the solid lines 71a, 71b, and 71c in the graph. As understood from FIG. 7A, the combined capacitances of the capacitors connected in series largely depend on the smaller capacitance. Therefore, as the capacitance $C_G$ of the base electrode segment 13a (GND electrode segment) increases, the combined capacitance reflects a change of the capacitance $C_{S1}$ or $C_{S2}$ of the detecting electrode segment 13b (S1+ electrode segment) or the detecting electrode segment 13c (S1− electrode segment) as the variable capacitor, and a large capacitance change can be obtained. As illustrated in FIG. 5, the region having a length of 10P of the base electrode segment 13a (GND electrode segment) that partially overlaps the electrode segments 11a is provided so as to increase the capacitance $C_G$.

FIG. 7B is a graph illustrating a differential output (differential signal) of each of the pair of displacement detecting electrode segments and the pair of reference electrode segments. In FIG. 7B, solid lines 73a, 73b, and 73c represent differential signals of the combined capacitances $C_{G\_S1}$ and $C_{G\_S2}$. In other words, the solid lines 73a, 73b, and 73c represent signals made by subtracting the broken line 72a from the solid line 71a, the broken line 72b from the solid line 71b, and the broken line 72c from the solid line 71c, respectively. In FIG. 7B, solid lines 74a, 74b, and 74c represent differential signals of the detecting electrode segment 13d (M1 electrode) and the detecting electrode segment 13e (M2 electrode) and correspond to the capacitance $C_G$ similar to FIG. 7A. More specifically, the solid lines 74a, 74b, and 74c represent differences between a combined capacitance $C_{G\_S3}$ of the capacitance $C_G$ and $C_{S3}$ and a combined capacitance $C_{G\_S4}$ of the capacitance $C_G$ and $C_{S4}$. The values of the capacitances $C_G$ of the solid lines 74a, 74b, and 74c are the same as those of the solid lines 71a, 71b, and 71c.

Since $C_{S3}$=0.2 pF and $C_{S4}$=0.1 pF, the solid lines 74a, 74b, and 74c have constant values equal to the maximum values of the solid lines 73a, 73b, and 73c. The calculating circuit 17 illustrated in FIG. 6 performs a differential operation.

The solid line 75b in FIG. 7C is a normalized signal (displacement signal) obtained by normalizing the solid line 73b in FIG. 7B by a value of the solid line 74b then multiplying by 1000. A value made by dividing the solid line 73a in FIG. 7B by the solid line 74a and a value made by dividing the solid line 73c by the solid line 74c have the same maximum value, the same minimum value, and the same middle value (0) through the differential calculation. A value between these values exhibits a slight asymmetry. The actual numerical value is most asymmetrical in the status 1 (and the status 3) and shift by −3.03%, −0.62% and −0.01% relative to the true value of 500 when the capacitance $C_G$ is 0.1 pF, 0.4 pF, and 4.0 pF. FIG. 7C illustrates a case where the capacitance $C_G$ of 0.4 pF, and a display is omitted in a case where the capacitance $C_G$ has another value because there are few differences even if they are illustrated in the same graph. In the normalization illustrated in FIG. 7C, irrespective of the capacitance $C_G$, almost the same characteristic is obtained. At this time, when the capacitance $C_G$ is maintained to be large, a raw output increases, a SN (signal to noise) ratio improves, and a resolution becomes higher. The calculating circuit 17 illustrated in FIG. 6 performs this normalization.

FIGS. 8A to 8C are graphs illustrating a displacement signal (output signals from two pairs of displacement detecting electrode segments) based on the capacitance formed by the fixed electrode 13 and the movable electrode 11. FIG. 8A illustrates a result of the differential operation and the normalization operation illustrated in FIGS. 7B and 7C for a pair of first displacement detecting electrode segments including the detecting electrode segments 13b and 13c and a pair of second displacement detecting electrode segments including the detecting electrode segments 13f and 13g. An abscissa axis in FIG. 8A denotes the status illustrated in FIG. 5 and represents a range of two periods. An ordinate axis in FIG. 8A illustrates a value corresponding to a change of the normalized capacitance.

In FIG. 8A, a solid line 81 denotes a displacement signal $S_1$ based on the pair of first displacement detecting electrode segments. A broken line 82 denotes a displacement signal $S_2$ based on the pair of second displacement detecting electrode segments. The displacement signals $S_1$ and $S_2$ are output from the calculating circuit 17 as illustrated in FIG. 6. The displacement signal $S_2$ has a phase difference (by one status of 45°) of (1/8)P from the displacement signal $S_1$. A solid line 83 denotes a middle value (0), a broken line 84 denotes a positive threshold, and a broken line 85 denotes a negative threshold.

FIG. 8B is a graph illustrating values obtained by discretizing displacement signals $S_1$ and $S_2$ illustrated by the solid line 81 and the broken line 82 in FIG. 8A with positive and negative thresholds illustrated by broken lines 84 and 85. In FIG. 8B, a range illustrated by the broken line 84 higher than the positive threshold is expressed by H, a range illustrated by the broken line 85 lower than the negative threshold is expressed by L, and M is disposed between both thresholds. A solid line 86 is a displacement signal $S_{1P}$ obtained by discretizing the displacement signal $S_1$, and a broken line 87 is a displacement signal $S_{2P}$ obtained by discretizing the displacement signal $S_2$. The calculating circuit 17 outputs the displacement signals $S_{1P}$ and $S_{2P}$, as illustrated in FIG. 6. FIG. 8C is a table of the displacement signals $S_{1P}$ and $S_{2P}$ illustrated in FIG. 8B for each status. Since the same pattern does not appear in the eight status from the status 0 to the status 7, this embodiment can separate and detect an angle for each (1/8)P.

This embodiment may provide a setting such that the calculating circuit 17 may output an interrupt signal INT when the displacement signals $S_1$ and $S_2$ cross the positive threshold (broken line 84) or the negative threshold (broken line 85) illustrated in FIG. 8A in the ascending direction or descending direction. Thereby, the interrupt signal is sent to the lens microcomputer 101 illustrated in FIG. 1 and the lens microcomputer 101 can easily confirm the rotated angle and rotated direction of the MF operation ring based on the discrete displacement signals $S_{1P}$ and $S_{2P}$. The lens microcomputer 101 sequentially reads the displacement signals $S_1$ and $S_2$ out of the calculating circuit 17, and can more precisely detect a rotation of the MF operation ring 108, improving the operability in the MF mode.

In discretizing a linearly changing output signal using positive and negative thresholds and into three stages of "H," "M," and "L", pulse switching can be equally divided by setting a phase difference between the two displacement signals to (1/8)P or 45° where 45° is a significant phase difference. In a three-stage discretization using three pairs of displacement detecting electrode segments, the pulse interval is equally divided and twelve different statuses can be obtained by setting each phase difference to (1/12)P or 30°. In this case, 30° and 60° are significant phase differences. While this embodiment describes the three-stage discretization, a two-stage discretization for two-phase signals of H and L using one threshold, a phase difference of (1/4)P or 90° is necessary to obtain four different, equally divided statuses. In a three-phase signal, a phase difference of (1/6)P or 60° is necessary to obtain six different, equally divided statuses, and 60° and 120° are significant phase differences.

This embodiment obtains capacitance information through a differential operation based on a plurality of displacement detecting electrode segments and reference electrodes for displacement detections. Therefore, a displacement can be stably detected even with a stray capacitance and a parasitic capacitance that occurs between the electrodes and the neighboring objects. Even when a peripheral environment changes or a gap fluctuates between the movable electrode and the fixed electrode, a displacement can be stably detected by a normalization operation of an output of a pair of reference electrodes illustrated in FIG. 7C.

Second Embodiment

Figure 9:
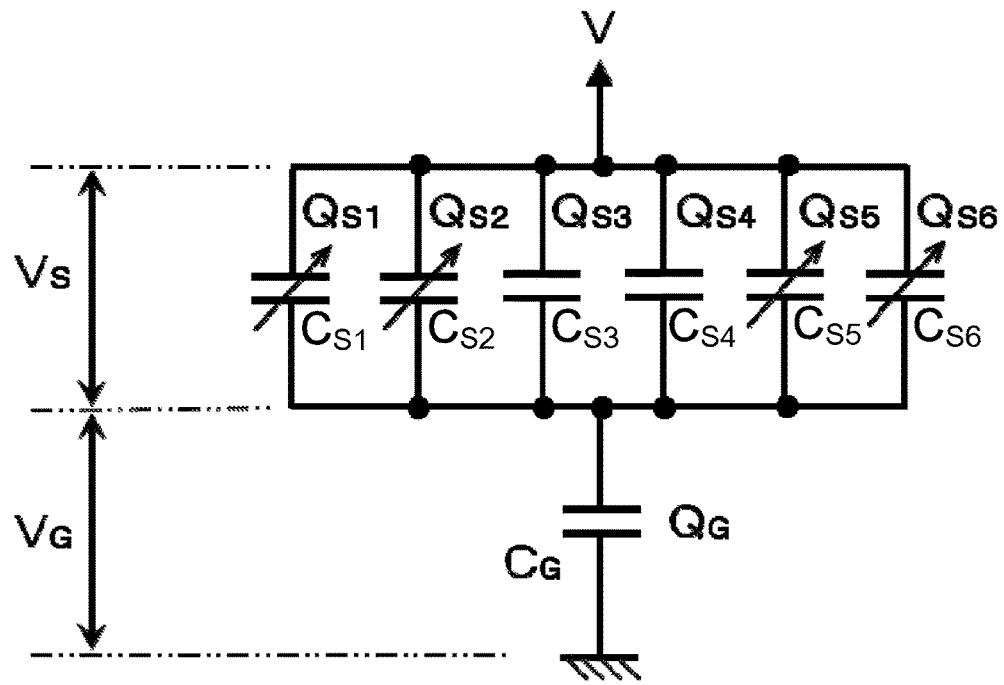
FIG. 9 is an equivalent circuit diagram of the fixed and movables electrode according to a second embodiment.

Referring now to FIG. 9, a description will be given of a second embodiment of the present invention. This embodiment is different from the first embodiment that detects the capacitances using the analog switch array 15 and the time division, in applying a voltage to parallel connected detecting electrode segments at once so as to detect the capacitances.

FIG. 9 is an equivalent circuit diagram of the fixed electrode 13 and the movable electrode 11. This embodiment discusses a voltage application to parallel connected detecting electrode segments at once. The hardware structure of the movable electrode 11 and the fixed electrode 13 in this embodiment is similar to that of the first embodiment, and a description thereof will be omitted.

As illustrated in FIG. 9, this embodiment applies voltage V between the base electrode segment 13a (GND electrode segment) and respective detecting electrode segments 13b to 13g (S1+ electrode segment, S1− electrode segment, M1 electrode segment, M2 electrode segment, S2+ electrode segment, and S2− electrode segment). $V_G$ is a voltage applied between both ends of the capacitance $C_G$. Vs is a voltage applied between both ends of parallel connected capacitances $C_{S1}$, $C_{S2}$, $C_{S3}$, $C_{S4}$, $C_{S5}$, and $C_{S6}$ (capacitors). As illustrated in Expression (1) in FIG. 9, $V=V_s+V_G$ is established. $Q_{S1}$, $Q_{S2}$, $Q_{S3}$, $Q_{S4}$, $Q_{S5}$, and $Q_{S6}$ are charge amounts charged in the capacitances $C_{S1}$, $C_{S2}$, $C_{S3}$, $C_{S4}$, $C_{S5}$, and $C_{S6}$. Since $V_s$ is a voltage applied between both ends of each capacitor, as expressed in Expression (3) in FIG. 9, a charge amount of each capacitor is proportional to the capacitances $C_{S1}$, $C_{S2}$, $C_{S3}$, $C_{S4}$, $C_{S5}$, and $C_{S6}$.

A charge amount $Q_G$ charged in the capacitance $C_G$ by the base electrode segment 13a is equal to a total value (sum) of charge amounts $Q_{S1}$, $Q_{S2}$, $Q_{S3}$, $Q_{S4}$, $Q_{S5}$, and $Q_{S6}$ charged in the capacitances $C_{S1}$, $C_{S2}$, $C_{S3}$, $C_{S4}$, $C_{S5}$, and $C_{S6}$, as expressed by Expression (2) in FIG. 9. Changes of the variable capacitors having the capacitances $C_{S1}$ and $C_{S2}$ have a phase difference of 180° and changes of the variable capacitors having the capacitances $C_{S5}$ and $C_{S6}$ have a phase difference of 180°. Hence, $(Q_{S1}+Q_{S2})$ and $(Q_{S5}+Q_{S6})$ always have constant values. The charge amount $Q_G$ charged in the capacitance $C_G$ has a constant value. In other words, information proportional to each capacitance can be obtained by providing unillustrated detectors configured to individually detect the charge amounts $Q_{S1}$, $Q_{S2}$, $Q_{S3}$, $Q_{S4}$, $Q_{S5}$, and $Q_{S6}$ charged in the capacitances $C_{S1}$, $C_{S2}$, $C_{S3}$, $C_{S4}$, $C_{S5}$, and $C_{S6}$. This embodiment can effectively reduce the nonlinearity described in the first embodiment, and more precisely detect the displacement.

Third Embodiment

Referring now to FIGS. 10A to 10D, a description will be given of a third embodiment of the present invention. FIGS. 10A to 10D illustrate a structural diagram of an interchangeable lens 1a according to this embodiment.

Figure 10A:
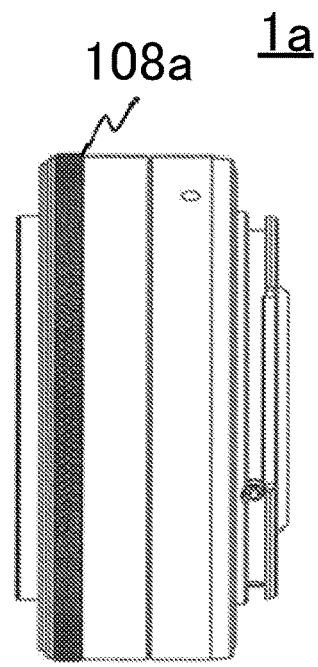
FIGS. 10A to 10D are structural diagrams of an interchangeable lens according to the third embodiment.
Figure 10B:
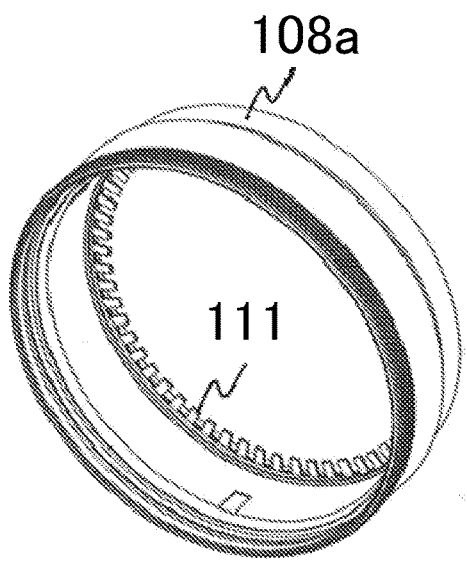

FIG. 10A is an overview of the interchangeable lens 1a. Reference numeral 108a denotes a MF operation ring (movable member). FIG. 10B is a perspective view of the MF operation ring 108a. Reference numeral 111 denotes a movable electrode. The movable electrode 11 according to the first embodiment is a cylindrical electrode but the movable electrode 111 according to this embodiment is a disc shaped electrode. As illustrated in FIG. 10B, the movable electrode 111 has a periodic pattern of fan-shaped electrode segments in the circumferential direction, each of which extends in a radial direction, and so-called comb teeth parts in the movable electrode 111 are connected outside and mutual fan-shaped electrode segments are connected.

Figure 10C:
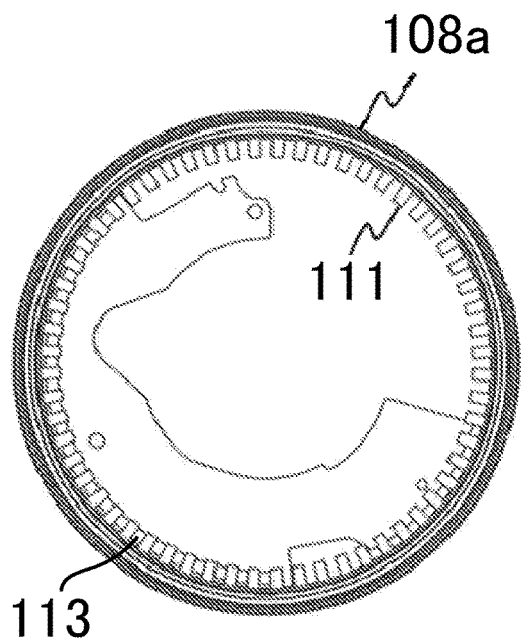
Figure 10D:
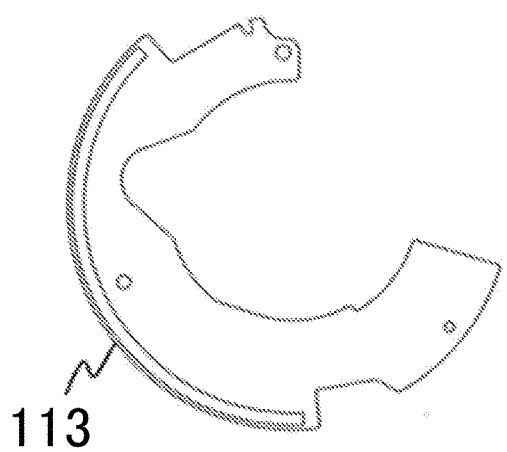

FIG. 10C is a view of the MF operation ring 108a integrated with the movable electrode 111 and a fixed electrode 113 that includes a base electrode segment and detecting electrode segments viewed from the optical axis direction. FIG. 10D is illustrates a hardware substrate including only the fixed electrode 113. The base electrode segment and the detecting electrode segment described according to the first embodiment are similarly arranged along the circumferential direction on the fixed electrode 113 having a fan shape and extends in the circumferential direction. The movable electrode 111 and the fixed electrode 113 are provided opposite to each other and spaced from each other at a constant gap in the optical axis direction. Even the structure of this embodiment can detect a displacement similarly to the first embodiment.

While each embodiment describes a detection of a rotation, a similar structure can similarly detect a displacement in a linear direction as described with reference to FIGS. 4A to 4D and FIG. 5. Each embodiment spaces the fixed electrode and the movable electrode from each other with a gap (interval) so as to form a capacitor (capacitance), but they may mechanically contact each other via an insulation layer as long as there is an electrical gap.

In each embodiment, the displacement detecting apparatus (operation angle detector 109) includes a first electrode (fixed electrode 13), a second electrode (movable electrode 11), and a detector (signal processor including the calculating circuit 17). The first electrode includes a base electrode segment 13a and a plurality of detecting electrode segments 13b to 13g. The second electrode has a predetermined periodic pattern, and is movable relative to the first electrode. The detector detects a displacement (rotated angle) based on the capacitance between the first electrode and the second electrode.

The predetermined periodical pattern of the second electrode may have a predetermined period (pitch P) in a predetermined direction (displacement direction and detecting direction). The base electrode segment of the first electrode has a length of (L×P) that is an integral multiple of a predetermined period in the predetermined direction where L is a natural number.

The plurality of detecting electrode segment may include a first detecting electrode segment (detecting electrode segment 13b) and a second detecting electrode segment (detecting electrode segment 13c). The first and second detecting electrode segments have a phase difference of 180° with respect to a predetermined periodic pattern of the second electrode. The first and second detecting electrode segments may be a pair of detecting electrodes having a length (M+0.5)×P in the predetermined direction, where M is an integer equal to 0 or larger, and P is a period of the second electrode. The plurality of detecting electrode segments may have a plurality of pairs of detecting electrodes as a pair of detecting electrodes in the predetermined direction. Each of a plurality of pairs of detecting electrodes has a significant phase difference with respect to the second electrode in the predetermined direction.

The plurality of detecting electrodes may include a third detecting electrode segment (detecting electrodes 13d) and a fourth detecting electrode segment (detecting electrodes 13e). The third and fourth detecting electrode segments have a pair of reference electrode segments having lengths of N×P and (N+Q)×P in the predetermined direction where N and Q are natural numbers, and P is the period of the second electrode. The plurality of detecting electrode segments may include a fifth detecting electrode segment (detecting electrode segment 13f) and a sixth detecting electrode segment (detecting electrode segment 13g). The fifth and sixth detecting electrode segments have a phase difference of 180° with respect to the predetermined periodic pattern of the second electrode.

The plurality of detecting electrode segments may be disposed in the predetermined direction. The base electrode segment is disposed on one side (one of the left and right lengths 2P in FIG. 5) or both sides (both left and right areas each having lengths of 2P in FIG. 5) of the plurality of detecting electrode segment in the predetermined direction. The base electrode segment is disposed at least on one side of the plurality of detecting electrode segments in a direction orthogonal to the predetermined direction (in an area having a length of 10P above the detecting electrode segments 13b to 13g in FIG. 5). Part of the base electrode segment overlaps the periodic pattern (electrode segments 11a) of the second electrode in the predetermined direction in an area having the length of 10P between the left and right lengths of 2P in the overall lengths of 14P. The detector may detect a displacement based on a combined capacitance as the capacitance of the base electrode segment and the plurality of detecting electrode segment (the combined capacitance of the capacitors connected in series and including the base electrode segment and each detecting electrode segment).

The plurality of detecting electrode segment may include a first detecting electrode segment (detecting electrode segment 13b) and a second detecting electrode segment (detecting electrode segment 13c). The base electrode segment and the first detecting electrode form as a combined capacitance a first combined capacitance $C_{G\_S1}$ ($1/C_{G\_S1}=1/C_G+1/C_{S1}$). The base electrode segment and the second detecting electrode form as a combined capacitance a second combined capacitance $C_{G\_S2}$ ($1/C_{G\_S2}=1/C_G+1/C_{S2}$). The first and second combined capacities change in accordance with a relative movement between the first and second electrodes. The first and second detecting electrode segments may have a phase difference of 180° with respect to the predetermined periodic pattern of the second electrode. Each of the first and second detecting electrode segments may have a pair of detecting electrodes in the predetermined electrodes having a length of $(M+0.5)\times P$ in the predetermined direction where M is an integer of 0 or larger, and P is a period of the second electrode. The detector may detect a displacement based on the first differential signal ($C_{G\_S1}-C_{G\_S2}$) between the first and second combined capacitances.

The plurality of detecting electrode segments may include a third detecting electrode segment (detecting electrode segment 13d) and a fourth detecting electrode segment (detecting electrode segment 13e). The base electrode segment and the third detecting unit form as the combined capacity a third combined capacitance $C_{G\_S3}$ ($1/C_{G\_S3}=1/C_G+1/C_{S3}$). The base electrode segment and the fourth detecting unit form as the combined capacity a fourth combined capacitance $C_{G\_S4}$ ($1/C_{G\_S4}=1/C_G+1/C_{S4}$). The detector detects a displacement based on a displacement signal (normalized signal illustrated by the solid line 75b in FIG. 7C) obtained based on the first differential signal ($C_{G\_S1}-C_{G\_S2}$) and the second differential signal ($C_{G\_S3}-C_{G\_S4}$) between the third combined capacitance and the fourth combined capacitance. The third and fourth detecting electrode segments may be a pair of reference electrode segments having lengths of $N\times P$ and $(N+Q)\times P$ in the predetermined direction where N and Q are natural numbers.

The plurality of detecting electrode segments may include a fifth detecting electrode segment (detecting electrode segment 13f) and a sixth detecting electrode segment (detecting electrode segment 13g). The base electrode segment and the fifth detecting unit form as the combined capacitance a fifth combined capacitance $C_{G\_S5}$ ($1/C_{G\_S5}=1/C_G+1/C_{S5}$). The base electrode segment and the sixth detecting unit form as the combined capacitance a sixth combined capacitance $C_{G\_S6}$ ($1/C_{G\_S6}=1/C_G+1/C_{S6}$). The fifth and sixth combined capacitances change in accordance with a relative movement between the first and second electrodes. The displacement detecting apparatus may further include a selector (analog switch array 15) configured to select as the combined capacitance one of the first combined capacitance, the second combined capacitance, the third combined capacitance, the fourth combined capacitance, the fifth combined capacitance, and the sixth combined capacitance.

Each embodiment can provide a displacement detecting apparatus, lens barrel, and image pickup apparatus, which has a low power consumption and a high resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment provides a first electrode (fixed electrode 13) to a fixed member (guide cylinder 12), and a second electrode (movable electrode 11) to a movable member (MF operation ring 108). However, the present invention is not limited to each embodiment, and the first electrode may be provided to the movable member and the second electrode may be provided to the fixed member.

This application claims the benefit of Japanese Patent Application No. 2015-101566, filed May 19, 2015 which is hereby incorporated by reference herein in its entirety.

What is claimed is:

1. A displacement detecting apparatus comprising:
    a first electrode having a base electrode segment and a plurality of detecting electrode segments;
    a second electrode having a plurality of periodically arranged electrode segments, and displaceable relative to the first electrode; and
    a detector configured to detect a displacement of the second electrode relative to the first electrode based on a capacitance between the first electrode and the second electrode,
    wherein an area of an overlapping region between the base electrode segment and the electrode segments in the second electrode is constant, and
    wherein the base electrode segment of the first electrode has a length of an integral multiple of a pitch of the electrode segments in the second electrode in a direction in which the electrode segments in the second electrode are periodically arranged.

2. The displacement detecting apparatus according to claim 1, wherein the detector is configured to detect the displacement of the second electrode relative to the first electrode based on a capacitance between the base electrode segment and the electrode segments in the second electrode and a capacitance between the detecting electrode segments and the electrode segments in the second electrode.

3. The displacement detecting apparatus according to claim 1, wherein the plurality of detecting electrode segments include a first detecting electrode segment and a second detecting electrode segment, wherein the first detecting electrode segment and the second detecting electrode segment include a pair of detecting electrode segments having a phase difference of 180°.

4. The displacement detecting apparatus according to claim 3, wherein each of the pair of detecting electrode segments in the first detecting electrode segment and the second detecting electrode segment has a length of (M+0.5)×P in a direction in which the electrode segments in the second electrode are periodically arranged, where M is an integer of 0 or larger and P is a pitch of the electrode segments in the second electrode.

5. The displacement detecting apparatus according to claim 3, wherein the plurality of detecting electrode segments include a plurality of pairs of detecting electrode segments having a significant phase difference with respect to the pitch of the electrode segments in the second electrode.

6. The displacement detecting apparatus according to claim 3, wherein the plurality of detecting electrode segments include a third detecting electrode segment and a fourth detecting electrode segment, wherein the third detecting electrode segment and the fourth detecting electrode segment include a pair of detecting electrode segments, each of which has a constant area of an overlapping region with the electrode segments in the second electrode.

7. The displacement detecting apparatus according to claim 6, wherein the pair of detecting electrode segments in the third detecting electrode segment and the fourth detecting electrode segment have lengths of N×P and (N+Q)×P in a direction in which the electrode segments in the second electrode are periodically arranged, where N and Q are natural integers and P is a pitch of the electrode segments in the second electrode.

8. The displacement detecting apparatus according to claim 7, wherein one of the pair of detecting electrode segments in the third detecting electrode segment and the fourth detecting electrode segment has a length different from the other.

9. The displacement detecting apparatus according to claim 6, wherein the plurality of detecting electrode segments include a detecting electrode segment disposed next to the third detecting electrode segment and the fourth detecting electrode segment, and an area of an overlapping region between the detecting electrode segment and the electrode segments in second electrode is variable as the second electrode displaces relative to the first electrode.

10. The displacement detecting apparatus according to claim 6, wherein the plurality of detecting electrode segments include a fifth detecting electrode segment and a sixth detecting electrode segment, wherein the fifth detecting electrode segment and the sixth detecting electrode segment include a pair of detecting electrode segments having a phase difference of 180°.

11. The displacement detecting apparatus according to claim 1, wherein the plurality of detecting electrode segments are arranged in a direction in which the electrode segments in the second electrode are periodically arranged, and
wherein the base electrode segment is located at one end or both ends of the plurality of detecting electrode segments in the direction.

12. The displacement detecting apparatus according to claim 1, wherein the plurality of detecting electrode segments are arranged in a direction in which the electrode segments in the second electrode are periodically arranged, and
wherein the base electrode segment is located at one end of the plurality of detecting electrode segments in a direction orthogonal to the direction.

13. A lens barrel comprising:
a fixed member;
a movable member supported displaceably relative to the fixed member; and
a displacement detecting apparatus configured to detect a displacement of the movable member relative to the fixing member,
wherein the displacement detecting apparatus includes:
　a first electrode having a base electrode segment and a plurality of detecting electrode segments;
　a second electrode having a plurality of periodically arranged electrode segments, and displaceable relative to the first electrode; and
　a detector configured to detect a displacement of the second electrode relative to the first electrode based on a capacitance between the first electrode and the second electrode,
　wherein an area of an overlapping region between the base electrode segment and the electrode segments in the second electrode is constant, and
　wherein the base electrode segment of the first electrode has a length of an integral multiple of a pitch of the electrode segments in the second electrode in a direction in which the electrode segments in the second electrode are periodically arranged.

14. The lens barrel according to claim 13,
wherein the first electrode is provided to the fixed member and the second electrode is provided to the movable member, and
wherein the detector detects a displacement of the movable member.

15. The lens barrel according to claim 13, wherein a direction in which the electrode segments in the second electrode are periodically arranged is a rotation direction of the movable member, wherein the base electrode segment of the first electrode has a length of an integral multiple of a pitch of the electrode segments in the second electrode in the rotation direction.

16. An image pickup apparatus comprising:
a lens barrel; and
an image pickup unit configured to photoelectrically convert an optical image formed via an optical system in the lens barrel,
wherein the lens barrel includes a fixed member, a movable member supported displaceably relative to the fixed member, and a displacement detecting apparatus configured to detect a displacement of the movable member relative to the fixing member, and
wherein the displacement detecting apparatus includes:
　a first electrode having a base electrode segment and a plurality of detecting electrode segments;
　a second electrode having a plurality of periodically arranged electrode segments, and displaceable relative to the first electrode; and
　a detector configured to detect a displacement of the second electrode relative to the first electrode based on a capacitance between the first electrode and the second electrode,
　wherein an area of an overlapping region between the base electrode segment and the electrode segments in the second electrode is constant, and
　wherein the base electrode segment of the first electrode has a length of an integral multiple of a pitch of the electrode segments in the second electrode in a direction in which the electrode segments in the second electrode are periodically arranged.

17. The displacement detecting apparatus according to claim 1, wherein the area of the overlapping region between the base electrode segment and the electrode segments in the second electrode is constant during a relative displacement between the first electrode and the second electrode.

* * * * *